(12) United States Patent
Chhabra

(10) Patent No.: US 8,964,550 B1
(45) Date of Patent: Feb. 24, 2015

(54) AD-HOC WIRELESS COMMUNICATION SYSTEM WITH VARIABLE ATIM WINDOW

(75) Inventor: Kapil Chhabra, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 756 days.

(21) Appl. No.: 13/229,915

(22) Filed: Sep. 12, 2011

Related U.S. Application Data

(63) Continuation of application No. 12/167,442, filed on Jul. 3, 2008, now Pat. No. 8,018,882.

(60) Provisional application No. 60/947,765, filed on Jul. 3, 2007.

(51) Int. Cl.
*H04J 1/16* (2006.01)
*H04L 12/801* (2013.01)

(52) U.S. Cl.
CPC ........................ *H04L 47/10* (2013.01)
USPC .......................................... 370/235; 370/349

(58) Field of Classification Search
CPC ....... H04L 12/413; H04L 3/245; H04L 47/10; H04L 47/35; H04L 47/30; H04L 47/32; H04W 4/06
USPC ......... 370/349, 312, 443, 445, 447, 461, 462, 370/470, 471, 507, 235
See application file for complete search history.

(56) References Cited

U.S. PATENT DOCUMENTS

| 7,239,626 | B2 | 7/2007 | Kandala et al. |
| 7,594,125 | B2 | 9/2009 | Zhong |
| 2006/0028984 | A1 | 2/2006 | Wu et al. |
| 2006/0149980 | A1 | 7/2006 | Zhong |
| 2006/0251004 | A1* | 11/2006 | Zhong et al. .................. 370/318 |
| 2007/0133448 | A1 | 6/2007 | Gao et al. |
| 2007/0186105 | A1* | 8/2007 | Bailey et al. .................. 713/168 |
| 2007/0233860 | A1* | 10/2007 | Lillie et al. .................... 709/225 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Brenda H Pham

(57) ABSTRACT

A network device including a transceiver and a control module. The transceiver is configured to detect beacons or probe responses transmitted between stations in a network, wherein each of the stations is separate from other ones of the stations, and a first one of the stations includes the network device. The control module is configured to (i) determine a number of active conversations in the network based on the beacons or probe responses, (ii) adjust a length of a window based on the number of active conversations, and (iii) transition between power modes based on the length of the window. During the window, the control module is configured to transmit a frame via the transceiver, and wherein the frame indicates the network device has a packet to transmit to a second one of the stations.

21 Claims, 12 Drawing Sheets

(56) References Cited

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16/2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor Jan. 2001, 802.11d™-2001, 802.11g™-2003]; IEEE Standard for Information technology-Telecommunications and information exchange between systems- Local and metropolitan area networks-Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

IEEE Std 802.11d-2001 (Amendment to IEEE Std 802.11, 1999 Edition, IEEE Std 802.11a-1999, and IEEE Std 802.11b-1999) IEEE Standard for Information technology—Telecommunications and information exchange between systems—Local and metropolitan area networks—Specific requirements—Part 11: Wireless LAN Medium Access Control (MAC) and Physical Layer (PHY) specifications; Amendment 3: Specifications for operation in additional regulatory domains; Sponsor LAN/MAN Standards Committee of the IEEE Computer Society; Approved Jun. 14, 2001—IEEE-SA Standards Board; Approved Oct. 25, 2001—American National Standards Institute; 34 pages.

\* cited by examiner

FIG. 4

| Station Database | |
|---|---|
| Number of Stations in Network | 170 |
| Number of Active Stations in Network | 172 |
| Active Station IDs | 174 / 176 |

(170 Station Database, 172 Number of Stations in Network, 174 Number of Active Stations in Network, 176 Active Station IDs)

FIG. 5

Active Conv. Database — 180

| Index | Number of Active Conversations |
|---|---|
| Local | $AC_L$ |
| Remote $STN_1$ | $AC_{R1}$ |
| Remote $STN_2$ | $AC_{R2}$ |
| ... | ... |
| Remote $STN_N$ | $AC_{RN}$ |
| Total Remote | $AC_{RT}$ |
| Total Active | $AC_T$ |

FIG. 6

ATIM Window Database — 190

| Index | ATIM Window Length |
|---|---|
| Prev. Local | $ATIM_{LP}$ |
| Current Local | $ATIM_{LC}$ |
| Prev. Remote $STN_1$ | $ATIM_{RP1}$ |
| Current Remote $STN_1$ | $ATIM_{RC1}$ |
| Prev. Remote $STN_2$ | $ATIM_{RP2}$ |
| Current Remote $STN_2$ | $ATIM_{RC2}$ |
| ... | ... |
| Prev. Remote $STN_N$ | $ATIM_{RPN}$ |
| Current Remote $STN_N$ | $ATIM_{RCN}$ |
| Avg. Prev. w/ Local | $ATIM_{AVGPL}$ |
| Avg. Prev. w/o Local | $ATIM_{AVGP}$ |
| Avg. Current w/ Local | $ATIM_{AVGCL}$ |
| Avg. Current w/o Local | $ATIM_{AVGC}$ |

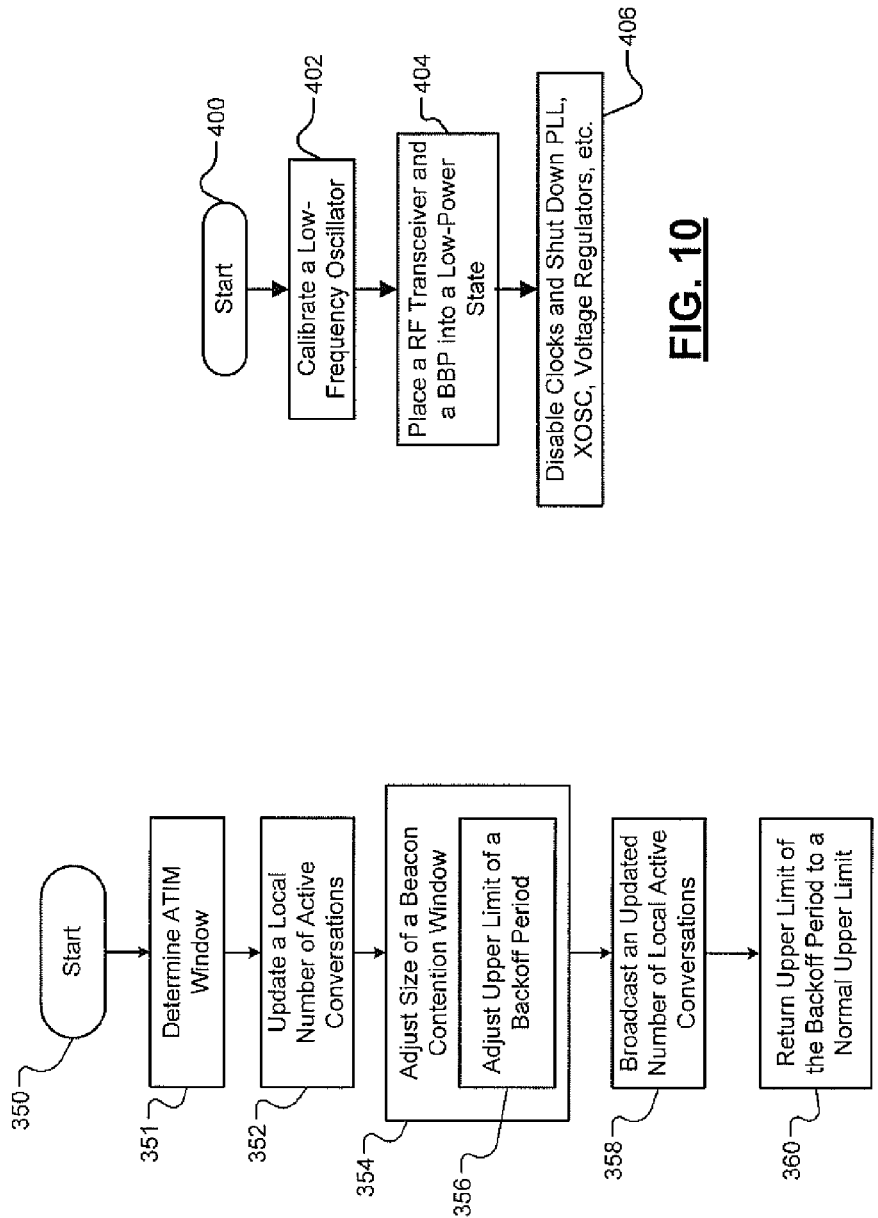

AD-HOC WIRELESS COMMUNICATION SYSTEM WITH VARIABLE ATIM WINDOW

CROSS-REFERENCE TO RELATED APPLICATIONS

This present disclosure is a continuation of U.S. application Ser. No. 12/167,442, filed on Jul. 3, 2008, which claims priority under 35 U.S.C. §119(e) to U.S. Provisional Application No. 60/947,765, filed on Jul. 3, 2007.

FIELD

The present disclosure relates to wireless networks, and more particularly to wireless networks operating in an ad-hoc mode.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

IEEE section 802.11, which is hereby incorporated by reference in its entirety, defines several different standards for configuring wireless Ethernet networks and devices. For example, 802.11 standards that have been popularized include 802.11, 802.11(a), 802.11(b), and 802.11(g). According to these standards, wireless network devices may be operated in either an infrastructure mode or an ad-hoc mode. In the infrastructure mode, the wireless network devices communicate with each other through an access point. In the ad-hoc mode, the wireless network devices (which are typically called stations or nodes) communicate directly with each other and do not employ an access point.

Referring now to FIG. 1, a wireless network 12 is shown that operates in an ad-hoc mode. The wireless network 12 includes multiple stations 14-1, 14-2, and 14-3 that transmit and receive wireless signals 16 directly with each other to form an ad-hoc network.

Power consumption of the stations is minimized to preserve battery life. To conserve power some stations implement a low-power mode in addition to an active mode. During the active mode, the stations transmit and/or receive data. During the low power mode, the stations may shut down components and/or alter operations. For example, stations may not transmit or receive data during the low-power mode. In wireless networks, stations typically are unable to remain in the low-power mode for a period of time that is sufficient to significantly reduce average power consumption.

In an ad-hoc network, a beacon is generated each beacon interval by one of the stations in that network. Each beacon interval has an associated announcement traffic indication map (ATIM) window and data transmission window. Each station remains awake after each beacon for at least the duration of the ATIM window.

An ATIM frame is transmitted during the ATIM window to indicate that a station has buffered packets for another station. Multiple stations may transmit ATIM frames during the ATIM window. In addition, there may be multicast ATIM messages that need to be sent during the ATIM window. When a station receives an ATIM frame during the ATIM window, the station remains awake for the entire beacon interval.

The length of the ATIM window is set at the time a wireless network is created by an ad-hoc creator. The ad-hoc creator may refer to a user or alternatively may refer to a station that is first to enter and/or create the network. The ATIM window may be sub-optimal. In other words, the ATIM window may be too long or too short depending upon a number of currently active conversations between stations. An active conversation refers to a communication session between two or more stations.

An ATIM window that is too long leads to a shorter effective data exchange window, which in turn leads to lower data throughput for a given beacon interval. An ATIM window that is too long also results in sub-optimal power savings since the amount of time the stations are in an awake state increases.

An ATIM window that is too short leads to longer latencies and/or packet loss. An ATIM frame is transmitted for each active conversation. Each ATIM frame is associated with a different active conversation and has a corresponding transmission and acknowledgement period. The transmission and acknowledgement periods may not overlap in time. Thus, one or more ATIM frames and/or corresponding acknowledgements may not be transmitted during an ATIM window when an increased number of ATIM frames are to be transmitted. The ATIM frames and acknowledgements that do not get transmitted in a first ATIM window or beacon interval are delayed and transmitted along with their corresponding data packets during subsequent beacon intervals. This can result in a backlog of ATIM frames and/or data packets.

SUMMARY

In general, in one aspect, this specification describes a network device including a transceiver and a control module. The transceiver is configured to detect beacons or probe responses transmitted between stations in a network, wherein each of the stations is separate from other ones of the stations, and a first one of the stations includes the network device. The control module is configured to (i) determine a number of active conversations in the network based on the beacons or probe responses, (ii) adjust a length of a window based on the number of active conversations, and (iii) transition between power modes based on the length of the window. During the window, the control module is configured to transmit a frame via the transceiver, and wherein the frame indicates the network device has a packet to transmit to a second one of the stations, a local station is provided and includes a memory and a control module. The memory stores a first status indicator that represents a number of active conversations in a wireless network and an ad-hoc traffic indication map (ATIM) window. The control module detects a change in the number of active conversations, modifies the first status indicator to generate an updated first status indicator based on the change, and adjusts a length of the ATIM window based on the updated first status indicator.

In general, in another aspect, this specification describes a method of operating a network device. The method includes: detecting beacons or probe responses transmitted between stations in a network, wherein each of the stations is separate from other ones of the stations, and a first one of the stations includes the network device. The method further includes determining a number of active conversations in the network based on the beacons or probe responses; adjusting a length of a window based on the number of active conversations; transitioning between power modes based on the length of the window; and during the window, transmitting a frame, wherein the frame indicates the network device has a packet to transmit to a second one of the stations.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 4 is a block diagram of a station database according to an embodiment of the present disclosure;

FIG. 5 is a block diagram of an active conversation database according to an embodiment of the present disclosure;

FIG. 6 is a block diagram of an ATIM window database according to an embodiment of the present disclosure;

FIG. 9 illustrates a method of operating a station in an ad-hoc wireless network in accordance with an embodiment of the present disclosure;

FIG. 10 illustrates an example method of shutting down a station that is operating in an ad-hoc mode in accordance with an embodiment of the present disclosure;

DESCRIPTION

Figure 1:
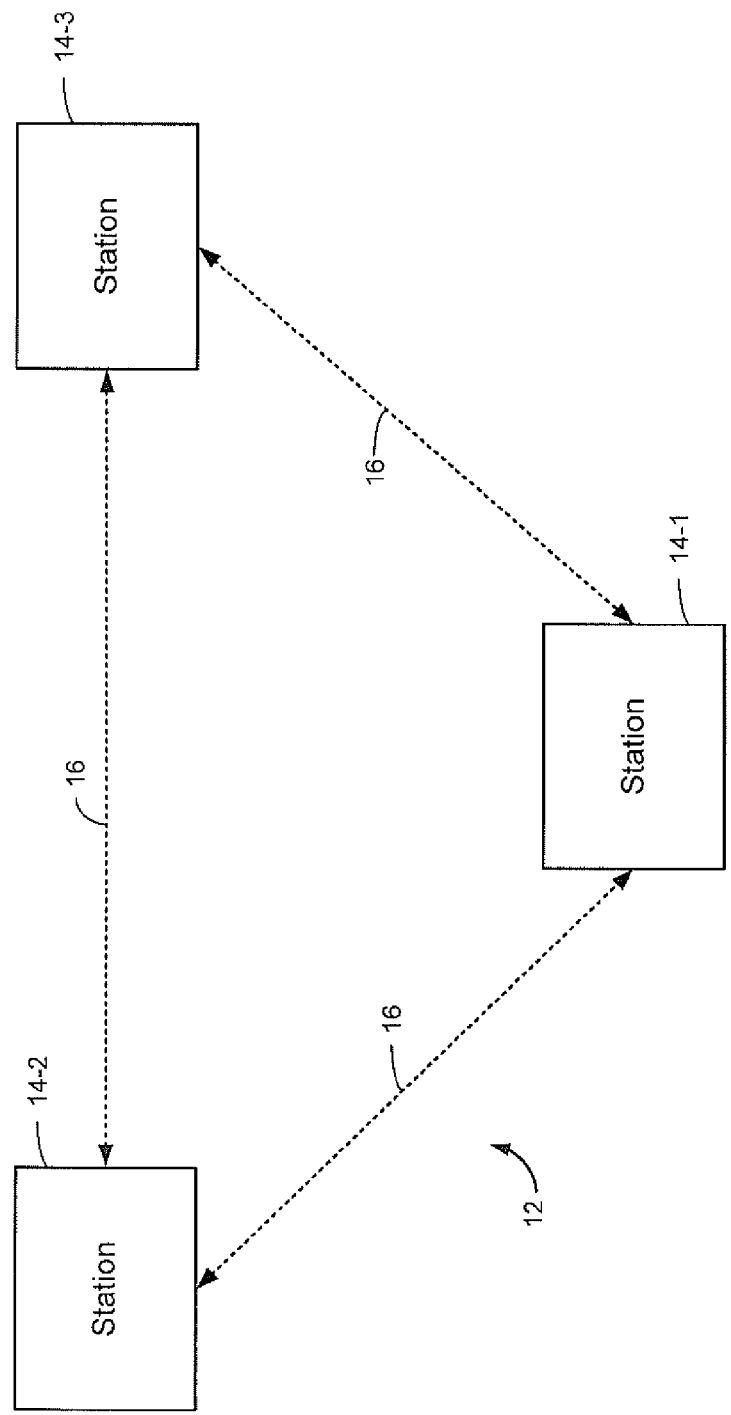
FIG. 1 is a functional block diagram that illustrates an ad-hoc wireless network according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
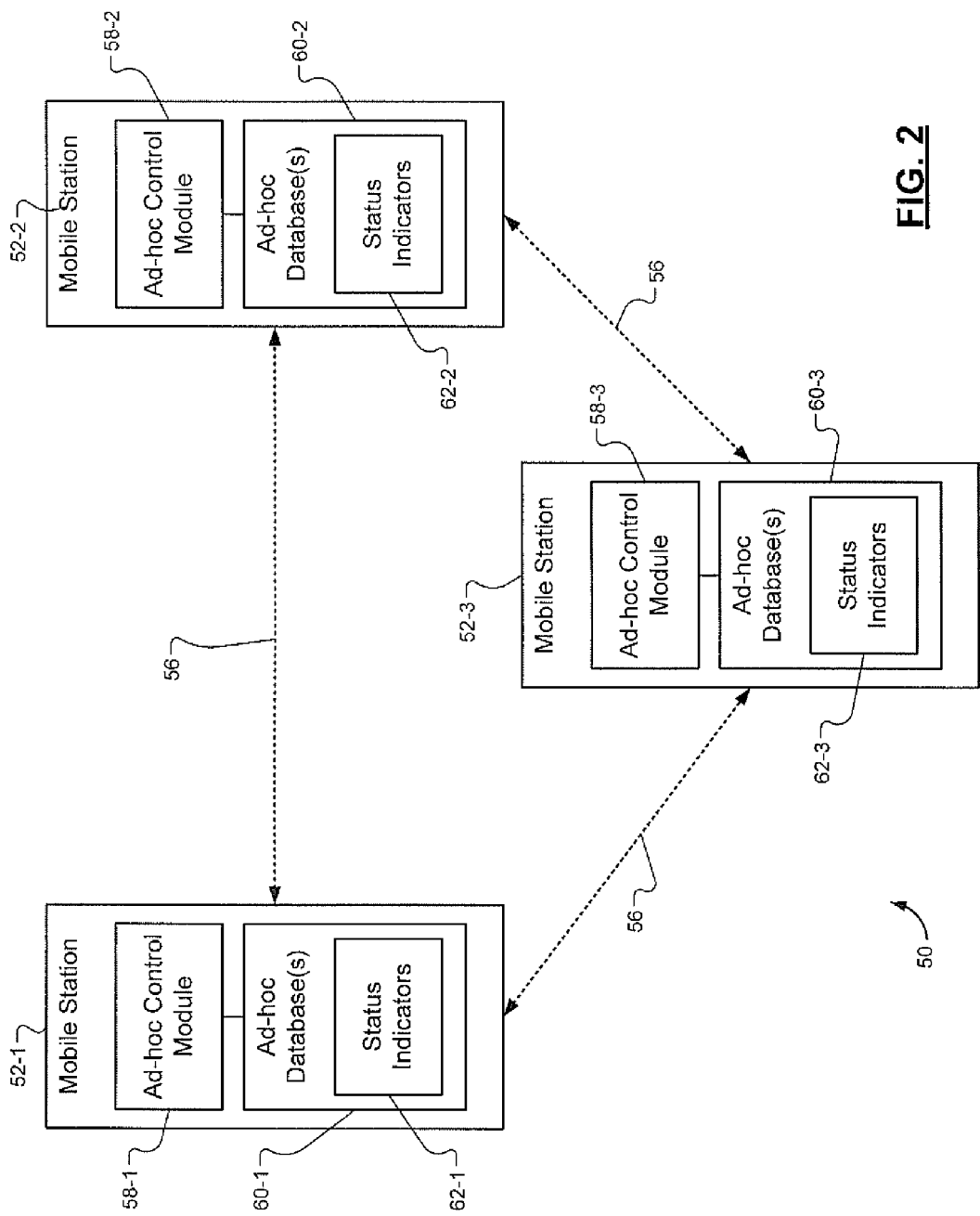
FIG. 2 is a functional block diagram of a wireless network that operates in an ad-hoc mode according to an embodiment of the present disclosure.

Referring now to FIG. 2, a functional block diagram of a wireless network 50 that operates in an ad-hoc mode is shown. The wireless network 50 includes multiple stations 52-1, 52-2 and 52-3 that transmit and receive wireless signals 56 directly with each other to form an ad-hoc network. The wireless signals 56 are transmitted and received without use of an access point when in the ad-hoc mode.

The stations 52-1, 52-2 and 52-3 may include mobile and non-mobile stations, desktop and laptop computers, cameras, network interfaces, cellular phones, printers, personal data assistants, gaming systems and devices, etc. The stations 52-1, 52-2 and 52-3 respectively include ad-hoc control modules 58-1, 58-2 and 58-3 and ad-hoc databases 60-1, 60-2 and 60-3.

The ad-hoc control modules 58-1, 58-2 and 58-3 control communication during the ad-hoc mode. Each of the ad-hoc control modules 58-1, 58-2 and 58-3 tracks the number of stations in the wireless network 50 and the active conversations of each of the stations 52-1, 52-2 and 52-3. Each of the ad-hoc control modules 58-1, 58-2 and 58-3 determines one or more variable ATIM windows based on the number of active conversations in the wireless network 50. The ATIM windows may be determined based on various wireless network status indicators 62-1, 62-2 and 62-3, which are stored in the ad-hoc databases 60-1, 60-2 and 60-3. The status indicators 62-1, 62-2 and 62-3 may include previous and current status values, as well as predicted status values that indicate an estimate of future values.

The ad-hoc control modules 58-1, 58-2 and 58-3 control communication during the ad-hoc mode based on beacon intervals. Timing beacons are periodically generated by a designated one of the stations 52-1, 52-2 and 52-3. For example only, the beacon interval may be 100 time units in length and each time unit may equal 1.024 ms. The generation of a beacon signifies the beginning of a beacon interval and the beginning of the ATIM windows. Stations with buffered data packets transmit ATIM frames during the ATIM windows to initiate a data transfer to the other stations.

Figure 3:
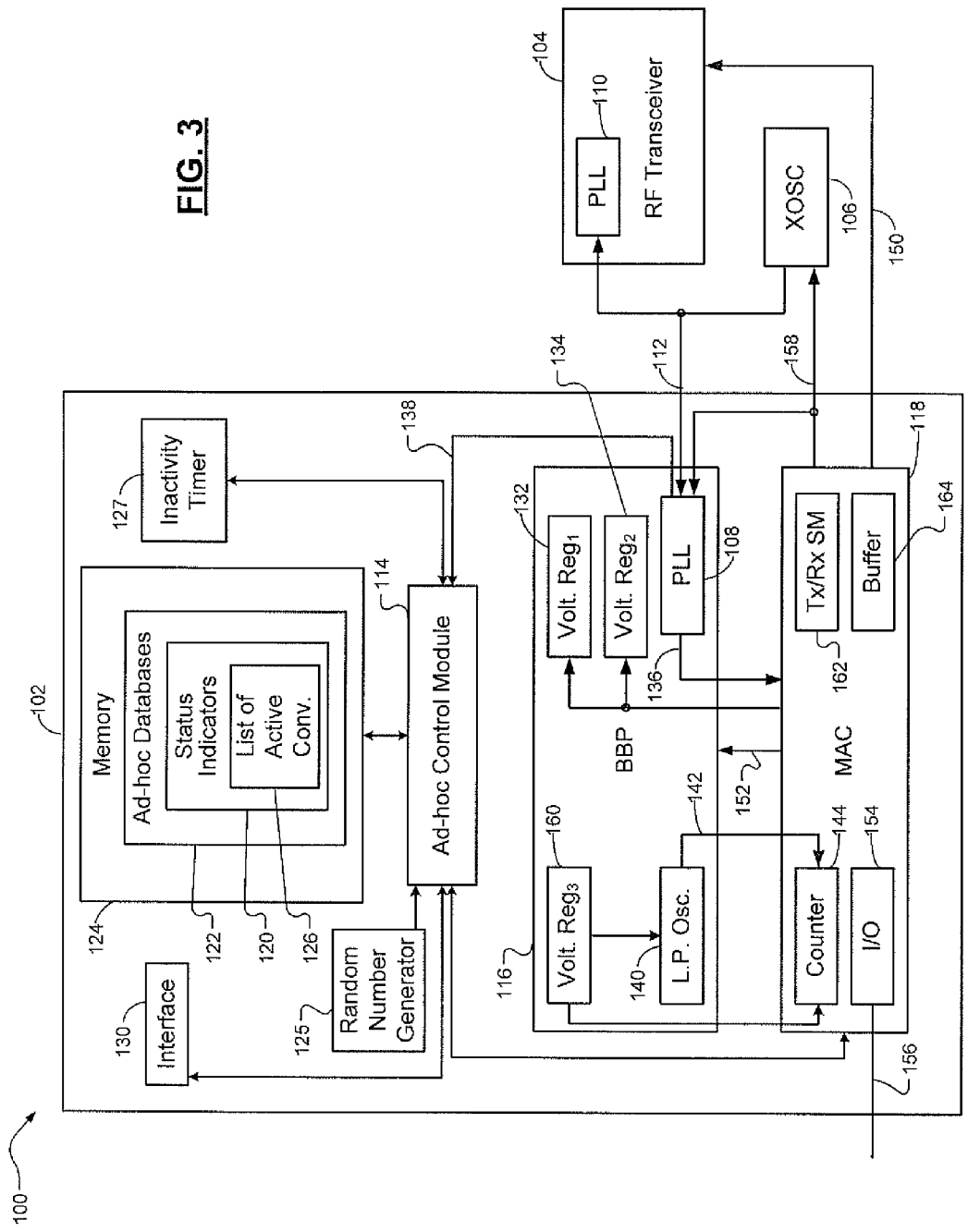
FIG. 3 is a functional block diagram of a wireless network communications device of a station that operates in an ad-hoc mode according to an embodiment of the present disclosure.

Referring now to FIG. 3, a functional block diagram of a wireless network device 100 of a local station that operates in an ad-hoc mode is shown. The wireless network device 100 is provided for example purposes only and may represent a communications architecture of any of the stations 52-1, 52-2 and 52-3 shown in FIG. 2. The embodiments disclosed herein may apply to various stations and/or wireless communication devices, which may have different architectures. The embodiments of the present disclosure are not limited to the architecture of FIG. 3.

The wireless network device 100 may operate in multiple modes including an infrastructure mode, an ad-hoc mode, an active mode, a low-power mode, a high-power mode, etc. In the infrastructure mode, the wireless network device 100 communicates with another communication device in a local or remote network via an access point. In the ad-hoc mode, the wireless network device 100, in general, communicates directly with another communications device in a local network without use of an access point. In the active and/or high-power modes, the wireless network device 100 processes incoming and outgoing data. In the low-power mode, the wireless network device 100 does not transmit or receive data.

The duration that the wireless network device 100 operates in the low-power mode may vary. A start time of the low-power mode may be variable and an end time of the low-power mode may be fixed relative to an ATIM window and/or beacon interval. The low-power mode may end before the start of a subsequent timing beacon. The wireless network device 100 returns to the active mode before a next or subsequent beacon is detected and/or generated.

In one implementation, the wireless network device 100 includes an SOC circuit 102, an external radio frequency (RF) transceiver 104, and a crystal oscillator (XOSC) 106. The crystal oscillator 106 can be located externally or the amplifier portion of the XOSC 106 can be integrated with the SOC circuit 102 and the crystal portion of the XOSC 106 can be located externally.

The RF transceiver 104 wirelessly transmits and/or receives data to and from an AP or another station. The XOSC 106 provides a reference signal to first and second phase-locked loops (PLL) 108 and 110. The first PLL 108 is located in the SOC circuit 102 and the second PLL 110 is located in the RF transceiver 104. The first and second PLL 108 and 110 generate clock signals that may be generated and calibrated based on a reference signal 112 from the XOSC 106.

In one implementation, the SOC circuit 102 includes an ad-hoc control module 114, a baseband processor (BBP) 116, and a medium access control (MAC) device 118. The ad-hoc control module 114 determines ATIM window values based on status indicators 120 stored in ad-hoc databases 122 of memory 124 including a list of active conversations 126. The ad-hoc control module 114 may also determine ATIM window values based on different delay periods including a random backoff period, which may be generated by a random number generator 125.

The list of active conversations 126 may include an identification of the stations associated with each conversation. The list of active conversations 126 includes a list of active conversations that directly involve the local station. The list of conversations 126 also includes a list of active conversations that do not involve the local station, but rather involve other stations in a wireless network of the local station. The other stations are referred to as remote stations. The lists of active conversations may include conversation and station identifications for each conversation.

The local station may snoop the destination MAC address of packets from a host to one of the stations in the wireless network to detect an active conversation. The local station may remove entries in the list of active conversations 126 after inactivity for a predetermined time period. The predetermined time period may correspond with or be the same length as an ATIM window and may be determined by an inactivity timer 127.

The ad-hoc control module 114 communicates with remote network devices by controlling operation of the BBP 116 and MAC 118 and/or transmission and reception of signals via the BBP 116 and MAC 118. For example, the ad-hoc control module 114 may control transmission and/or reception of ATIM frames, data signals, and acknowledgement signals based on the status indicators 120.

The ad-hoc control module 114 may communicate with network devices using wire-based communication via an interface 130. The interface 130 interface 130 may be connected to a host and may include and/or provide a link to a host interface such as peripheral component interconnect (PCI) interface.

The BBP 116 includes the first PLL 108, a digital voltage regulator 132, and an analog voltage regulator 134. The digital and analog voltage regulators 132 and 134, respectively, supply regulated voltages to one or more components in the SOC circuit 102. Additional analog and/or digital voltage regulators and/or voltage regulators operating at other voltages may be employed. The first PLL 108 generates clock signals 136 for the MAC device 118, clock signals 138 for the ad-hoc control module 114 and clock signals for the BBP 116 based on the reference signal 112 from the XOSC 106.

The BBP 116 also includes a low-power oscillator 140 that provides a signal 142 to a counter 144 in the MAC device 118. The counter 144 determines when the wireless network device 100 wakes from the low-power mode before a timing beacon.

The MAC device 118 controls and selects different operating modes of the BBP 116 and the RF transceiver 104. During operation, the MAC device 118 instructs the BBP 116 and the RF transceiver 104 to transition to a low-power mode to conserve power.

The MAC device 118 transmits a transceiver mode signal 150 to the RF transceiver 104. The transceiver mode signal 150 instructs the RF transceiver 104 to operate in the active mode, the high-power mode or the low-power mode. The transceiver mode signal 104 also informs the RF transceiver 104 whether it is transmitting or receiving RF signals during the active mode. The RF transceiver 104 remains deactivated during the low-power mode and does not transmit or receive RF signals. The RF transceiver 104 may be completely shut down for maximum power reduction. During the low-power mode, the RF transceiver 104 may remain in a partially-ON state and utilize a small amount of power to allow for a quick transition from the low-power mode to the active mode and/or high-power mode.

The MAC device 118 also transmits a BBP mode signal 152 to the BBP 116. The BBP mode signal 152 instructs the BBP 116 to operate in the active mode or the low-power mode. The MAC device 118 may deactivate the XOSC 106 during the low-power mode to conserve power.

The MAC device 118 also includes an input/output (I/O) module 154, which may be a general purpose I/O module (GPIO). In the event that a station requires the wireless network device 100 to return to the active mode, the station triggers an I/O input 156 of the input/output module 154. If the I/O input 156 is triggered during the low-power mode, the wireless network device 100 returns to the active mode. Some host interfaces such as a compact flash card may not include a signal to trigger the I/O module 154. The ad-hoc control module 114 may generate an interrupt when the wireless network device 100 returns to the active mode and when a trigger is not received via the I/O input 156. The interrupt may be used to query a host to determine whether the host has data to transmit.

The MAC device 118 may instruct the BBP 116, the RF transceiver 104 and the PLL 110 to enter the low-power mode. The MAC device 118 disables internal clocks in the SOC circuit 102. The MAC device 118 next disables the first PLL 108, then the XOSC 106 and voltage regulators 132 and 134 with a disable signal 158.

Since the MAC device 118 disables the digital voltage regulator 132 during the low-power mode, the BBP 116 may also include a low-power digital voltage regulator 160. The low-power voltage regulator 160 dissipates less power than the other voltage regulators. The low-power voltage regulator 160 provides power for the low power oscillator 140 and the counter 144. The low-power voltage regulator 160 may also supply power to the memory 124 to retain the state of the SOC circuit 102. This allows for a short wake up time. The MAC device 118 also includes transmit and receive state machines 162 and a transmit buffer 164.

During the low power mode, the I/O module 154 monitors the I/O input 156. If the I/O input 156 is not triggered during the low-power mode, the wireless network device 100 returns to the high-power mode after the counter 144 reaches the end of a low-power period. In order to return to the active mode, the MAC device 118 enables the voltage regulators 132 and 134 and the XOSC 106, respectively. The MAC device 118 activates the first PLL 110. The MAC device 118 next enables the internal clocks to generate the clock signals 136 and 138. Finally, the MAC device 118 instructs the BBP 116 and the RF transceiver 104 to operate in the active mode.

The information contained in the databases described in the following FIGS. 4-6 may be generated and stored by each station in an ad-hoc wireless network, may be generated by a local station, or may be generated by a remote station and transmitted to the local station and vice versa. The information may be stored as numerical values or identifications.

Referring now to FIG. 4, a block diagram of a station database 170 is shown. The station database 170 includes status indicators for a number of stations that are current in a wireless network 172, a number of active stations in the wireless network 174, and a list of active stations identifications 176. A station may passively monitor one or more channels of the wireless network and determine the number of stations that are attached or in a wireless network, as well as the number of active stations in the wireless network. A station may also be informed via another station of this information by reception of an indication signal. A station may actively ping the wireless network and/or transmit request signals to one or more other stations to receive this information.

Referring now to FIG. 5, a block diagram of an active conversation database 180 is shown. The active conversation database 180 may include index entries with a corresponding number of active conversation values. The active conversation database 180 may include a number of active conversations of a local station $AC_L$, numbers of active conversations for each remote station $ACR_1$-$ACR_N$, a total number of active remote conversations $AC_{RT}$, and a total number of active conversations $AC_T$. N is the number of remote stations in a wireless network.

Referring now to FIG. 6, a block diagram of an ATIM window database 190 is shown. The ATIM window database 190 may include index entries with a corresponding ATIM window length. Each station in a wireless network may include an ATIM window database and determine an ATIM window length. This ATIM window length may be based on information stored in the databases 170 and 180 of FIGS. 4 and 5, as well as the information stored in the ATIM window database 190. The information in the ATIM window database 190 may be locally generated and/or remotely generated and received by a local station.

The ATIM window database 190 may include: previous and current local ATIM window length $ATIM_{LP}$, $ATIM_{LC}$, previous and current remote ATIM window lengths for each remote stations $ATIM_{RP1}$-$ATIM_{RPN}$, $ATIM_{RC1}$-$ATIM_{RCN}$, an average previous ATIM window length for all of the stations including the local station $ATIM_{AVGPL}$, an average previous ATIM window length for all of the remote stations $ATIM_{AVGP}$, an average current ATIM window length for all of the stations including the local station $ATIM_{AVGCL}$, and an average current ATIM window length for all of the remote stations $ATIM_{AVGC}$.

The term previous refers to a previous ATIM window length or ATIM period for a previous beacon interval. The term current refers to a current ATIM window length or ATIM period for a current beacon interval. The previous and current ATIM periods may be associated with any local and/or remote stations.

A previous ATIM window length and a current ATIM window length of a station may be the same or different. Previous and current ATIM window lengths of a first station may be the same or different than the previous and current ATIM window lengths of a second station. In one embodiment, the previous ATIM window lengths for each station of a wireless network are approximately the same. In another embodiment, the current ATIM window lengths for each station of a wireless network are approximately the same.

In yet another embodiment, the ATIM window lengths for each station of a wireless network may be adjusted for each beacon interval and converge to a common ATIM window length over two or more beacon intervals. The embodiments disclosed herein allow the ATIM window lengths of different stations to quickly converge to the common ATIM window length. Assuming that the wireless network is a single-hop ad-hoc network and assuming that communication traffic conditions and the total number of active conversations change slowly and infrequently, the ATIM window lengths for each station are approximately equal. A single-hop network refers to a wireless network where each station can monitor communication activity of every other station in the network. In contrast, a mesh or multi-hop network refers to when a station in a network is unable to monitor communication of every station in the network. Slow and infrequent changes may, for example, refer to changes that occur approximately once over a time period that is approximately five (5) time units in length. Quick and frequent changes may, for example, refer to multiple changes during a time period of less than approximately 5 time units in length.

Figure 7:
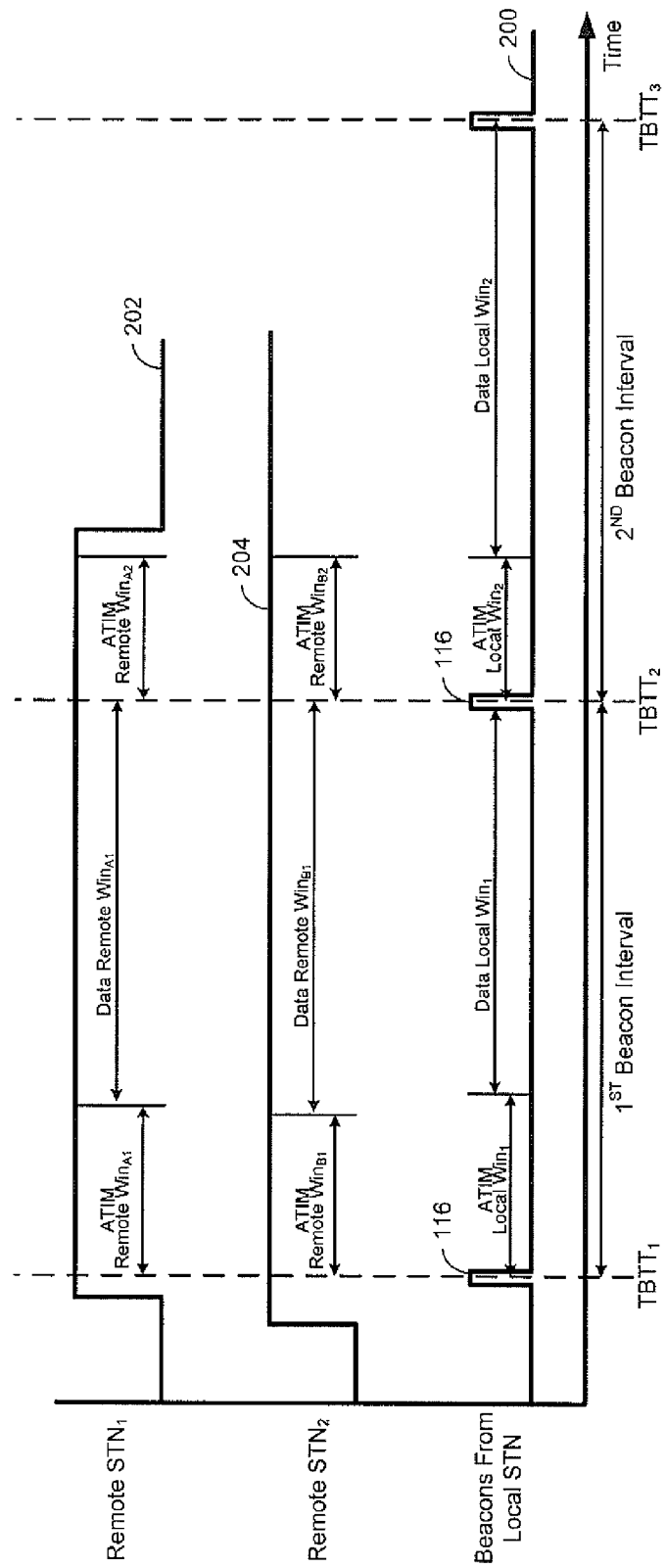
FIG. 7 is a timing diagram illustrating station operation events during an ad-hoc mode in accordance with an embodiment of the present disclosure.

Referring now to FIG. 7, an example timing diagram illustrating station operation events during an ad-hoc mode for two beacon intervals is shown. The length of the beacon intervals may be the same and may be determined at creation of a wireless network. Three signals are shown. The first signal 200 includes timing beacons that are generated by a first or local station. The second and third signals 202, 204 illustrate power modes of two remote stations. Although in the disclosed embodiment of FIG. 7 the local station generates the timing beacons, remote stations may generate timing beacons.

Each beacon interval includes an ATIM window followed by a data window that corresponds to each of the stations. The ATIM windows are determined by each of the stations. For example only, ATIM windows ATIM Local $Win_1$, ATIM Remote $Win_{A1}$, and ATIM Remote $Win_{B1}$ are shown respectively for the local and remote stations and for the first beacon interval. Respective data transmission windows Data Local $Win_1$, Data Remote $Win_{A1}$, and Data Remote $Win_{B1}$ for the first beacon interval and ATIM windows ATIM Local $Win_2$, ATIM Remote $Win_{A2}$, and ATIM Remote $Win_{B2}$ for the second beacon interval are also shown. ATIM frames and corresponding acknowledgement signals may be transmitted during the ATIM windows. The acknowledgement signals indicate that an ATIM frame was successfully received. Stations that transmit and/or receive ATIM frames remain in an active state throughout a current beacon interval and may remain active throughout a subsequent ATIM window period of a subsequent beacon interval.

In operation, each of the stations may be aware of the length of the beacon intervals, as well as the lengths of the ATIM windows of other stations. Each station operates in a corresponding power mode based on the beacon intervals. The stations are in an active and/or high-power mode before the generation and reception of a beacon signal. This is shown by the rising edges of the power mode signals of the remote stations.

Upon generation or reception of a beacon signal stations that were in a non-transmitting and/or inactive state during a previous beacon interval wait a corresponding distributed coordination function interframe space (DIFS) period and backoff period prior to transmitting an ATIM frame. The DIFS period may begin at each timing beacon and/or may be in sync with the beginning of each ATIM window. Stations that were actively transmitting data during the previous beacon interval may generate and transmit ATIM frames with reduced backoff periods. This allows the stations that were actively transmitting to continue and/or complete the previous transmission.

The station(s) may transmit ATIM frames after the channel(s) of a wireless network are in an idle state for the DIFS period or the DIFS period plus a corresponding random backoff period. This prevents collisions and conflicts on the channel(s) between competing ATIM frames from different stations. The DFIS period may be preset and remain at a fixed value. The DFIS period may be common for all of the stations within the wireless network. As an example, a station may count down the DIFS period or the DIFS period plus the corresponding random backoff period before transmitting an ATIM frame.

A backoff period may be added to the DIFS period to further increase the interframe space or time between ATIM frame transmissions. The backoff period may be randomly generated. The backoff period may be different for each station. A random number generator may be used to generate the backoff period for each station to reduce frame collisions. A random number generator may be located on each station for local generation of a random number. As an alternative, a random number generator may be located on one of the stations and random numbers may be transmitted to the other stations. The use of random backoff periods increases the time that each station must remain in receive mode.

The lengths of the ATIM windows of the stations may not be the same for a first beacon interval. The ATIM windows may be adjusted and converge to have a common length for the second beacon interval, as shown.

The lengths of the ATIM windows change based on the number of active conversations. When the number of active conversation decreases, as shown by the example of FIG. 7, the length of the ATIM windows decrease. The length of the ATIM windows may be determined during the data transmission windows.

A local station may know and indicate when its own active number of conversations has changed or is to change. For example, remote station $STN_1$ may indicate to the remote station $STN_2$ and the local station that the number of active conversations associated with remote station $STN_1$ is to decrease. This allows the local station and the remote stations to alter the lengths of the ATIM windows.

Alternatively, each station may monitor activity associated with other stations to determine when the number of active conversations has changed. The stations may then change the lengths of the ATIM windows for a subsequent beacon interval.

As another alternative, a station may request information regarding the number of active conversations from one or more other stations. A station may receive active conversation status information for the stations of a network from one or more stations.

The stations may power down and return to a low-power mode when the stations are in an inactive state for a predetermined period of time or when the stations remain inactive over a corresponding ATIM window. In the example shown, the first remote station $STN_1$ returns to a low-power mode after the second ATIM window ATIM Remote $Win_{A2}$.

Figure 8:
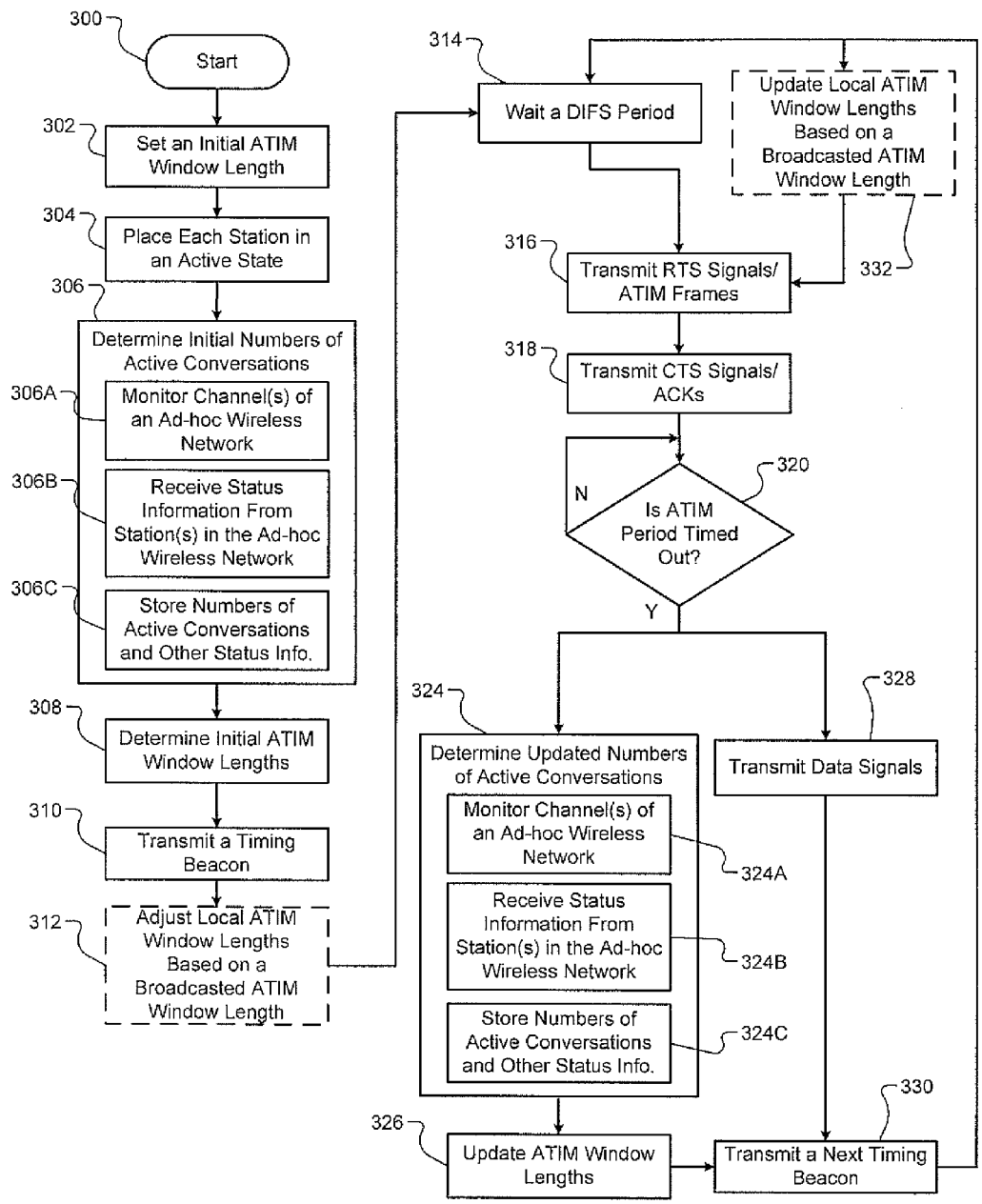
FIG. 8 illustrates a method of operating a wireless network in accordance with an embodiment of the present disclosure.

Referring now to FIG. 8, a logic flow diagram illustrating a method of operating a wireless network in an ad-hoc mode is shown. Although the following steps are primarily described with respect to the embodiments of FIGS. 2-6, the steps may be easily modified to apply to other embodiments of the present invention. The method may begin at step 300.

In step 302, an ad-hoc creator sets an initial ATIM window length and may also set a DIFS period. The ATIM window length may initially be set at a predetermined nominal value, such as 2 ms during network creation. As stations enter and join the wireless network they synchronize with the other stations in the wireless network.

In step 304, each station is placed in an active state. At the start of the method one or more stations may be in a sleep mode. Upon entering sleep mode, the stations begin to time a sleep interval in order to wakeup and stabilize circuitry of each station prior to a next scheduled beacon. A sleep counter may be used to time the sleep interval. This may also be done with a low-frequency oscillator that is described above in order to reduce current consumption. If the counter is up and the wakeup time has arrived, the circuitry of each station is enabled. Once the circuitry of each station has stabilized, the network time in each station is updated to a previous beacon time plus a beacon interval.

Any of the following steps 306-332 may be iteratively performed.

In step 306, each station determines a number of active conversations in the wireless network. In step 306A, each station may monitor one or more respective wireless network channels to determine traffic status of the channel(s) and to determine the number of active conversations in the wireless network. The active conversations may be determined by passively listening to beacons and/or probe responses that have the same service set identity (SSID) and/or basic service set identity (BSSID). Beacons may refer to signals broadcast by a station and may include timing information, status information, requests, etc. Probe responses may refer to one or more stations that transmit probe response signals including status information based on probe request signals. In an ad-hoc wireless network, the stations may have a BSSID that is used to identify a particular BSS within an area. The BSSID may include a MAC address that is generated based on a random number, an individual/group bit and a universal/local bit.

In step 306B, one or more stations may receive status information, such as any of the information in one of the databases from one or more of the other stations in the wireless network. Step 30613 may be performed in addition to or alternatively than step 306A. The status information may be transmitted using an intermission element in an outgoing beacon or in a probe response. An intermission element may have a protocol to include type, length and value fields. When stations are probed for status information, the stations may respond by generating a probe response that includes the requested information. A station may transmit current status information or changes in status information without reception of a request signal.

A station may transmit a broadcast probe request, as disclosed in 802.11d, which is incorporated herein by reference in its entirety. The broadcast probe request may include a request information element that requests a list of stations in the wireless network from a station in the wireless network. Stations in the wireless network may respond to the broadcast probe request by transmitting a probe response signal. The probe response signal may include an intermission element that indicates status information with regard to the stations and corresponding active conversations in the wireless network.

In step 306C, the numbers of active conversations and/or other status information from steps 203A and 203B may be stored in memories of each station.

In step 308, each station in the wireless network determines an ATIM window based on information stored in a list of active conversations and/or in databases, such as the list of active conversations and the station database, the active conversation database and the ATIM window database. The ATIM windows may be determined using equation 1:

$$ATIM = ActConv \times (DIFS + BackOff_{Max} + ATIMFrameDur + SIFS + AckFrameDur) \quad (1)$$

ATIM is the ATIM window length. ActConv is the number of active conversations. DIFS is the DIFS period. BackOff$_{MAX}$ is a maximum backoff period or limit. ATIMFrameDur is the time period associated with the transmission of an ATIM frame. SIFS is the corresponding SIFS period. AckFrameDur is the time period associated with the transmission of an acknowledgement signal that is generated in response to the reception of the ATIM frame.

The ATIM window lengths are determined before the generation of a beacon. This is referred to the pre-target beacon transmission time (TBTT). Each station may have a corresponding pre-TBTT period that ends at a TBTT. The pre-TBTT periods may occur during data transmission window periods, such as during the data transmission window periods. The ATIM window lengths may be bounded by a minimum value ATIM$_{MIN}$ and a maximum value ATIM$_{MAX}$.

In step 310, a station that is designated to generate beacons generates a beacon at the TBTT. A station with the smallest beaconing delay may be designated the beaconing station. The beacon may include an advertisement of a calculated ATIM window length. The calculated ATIM window length may be the ATIM window length calculated by the station transmitting the beacon or an ATIM window length calculated by another station. The calculated ATIM window length may be calculated using equation 1 and include the ATIM window length determined in step 308 or step 326. The calculated ATIM window length may be an average of ATIM window lengths determined by multiple stations. A station may receive ATIM window lengths individually determined by stations of the wireless network and determine an average ATIM window length. The average ATIM window length may be broadcast to the stations in the network.

The calculated ATIM window length may be calculated based on previous ATIM window periods, current ATIM window periods, and average ATIM window periods. Examples of these ATIM window periods are shown in FIG. 6.

In step 312, each station may adapt to the ATIM window length broadcasted by the beaconing station. Each station may adjust a corresponding ATIM window for that station based on the broadcasted ATIM window length. Each station may account for the beaconed ATIM window length in the current beacon interval, depending upon transmission and processing times. A local station may increase or decrease a local ATIM window length based on one or more broadcasted ATIM window lengths. A station may broadcast an ATIM window length of any station in the wireless network via a timing beacon of a beacon interval or by some other beacon or transmission signal.

In step 314, each of the non-transmitting and/or inactive stations waits a DIFS period and a corresponding backoff period. The DIFS and/or backoff periods allow new stations to join the wireless network and allow for other management and control frames to be sent. The DIFS and/or backoff periods can be used to inform existing stations in the network that a station has joined or left the BSS.

Occasionally, there may be situations when a station does not receive data from one of the other stations. During the DIFS and/or backoff periods, a station can optionally send messages that request another station to raise its power level or to resend requested information or data.

In step 316, request to send (RTS) signals, which may include ATIM frames, may be transmitted. If more than one frame is to be transmitted, SIFS intervals may be used between frames. The sequence of transmission for the ATIM frames may proceed with successive transmission by the stations as determined by the backoff periods. For example, station A may be followed by station B, which may be followed by station C, until each station to transmit an ATIM frame has transmitted or until the end of the ATIM window. Mobile station B will be allowed to transmit at the earlier of the end of mobile station A's slot time or after an SIFS interval that follows the end of mobile station A's slot time.

The designation of stations as station A, station B, etc. can be made in any suitable fashion. The designation of stations may be based at least in part by the backoff period. The station with the shortest backoff period is has the highest probability of transmitting its ATIM frame first and thus may be designated station A.

In step 318, after a short interframe space (SIFS) period, stations that receive the ATIM frames may generate and transmit clear to send (CTS) signals. The CTS signals may include acknowledgements that the RTS signals were received. The clear to send signal may indicate permission to send data signals.

In step 320, control for each of the stations determines when the calculated ATIM period, which begins at beacon transmission, has timed out. After the calculated ATIM period control proceeds to steps 324 and 328. For example only, steps 324-326 may be performed during step 328.

The following steps 324-326 may be performed during one or more of steps 314-320.

In step 324, each station determines an updated number of active conversations in the wireless network. In step 324A, each station may monitor one or more respective wireless network channels to determine traffic status of the channel(s) and determine an updated number of active conversations in the wireless network. Each station updates the number of active conversations to generate current values.

In step 324B, one or more stations may receive status information, such as any of the information in one of the databases from one or more of the other stations in the wireless network. Each station updates the number of active conversations to generate current values.

In step 324C, the numbers of active conversations and/or other status information from steps 324A and 324B may be stored in memories of each station.

In step 326, each station in the wireless network calculates an updated ATIM window length. Each station generates current ATIM window lengths to replace the previously generate ATIM window lengths. The ATIM window lengths may be determined using equation 1.

In step 328, data signals may be transmitted. The data signals are transmitted during data transmission windows, which adjust according to corresponding ATIM window lengths. The length of a data transmission window is equal to the length of a beacon interval minus the length of the corresponding ATIM window. Although shown as being performed during step 314, step 328 may be performed during one or more of steps 316-326.

In step 330, control of the designated beaconing station may generate a next beacon after a previous beacon interval. The stations may return to step 314 and/or perform step 332 after receiving the next beacon.

In step 332, if not adapted previously, each station may adapt to the ATIM window length broadcasted by the beaconing station. Each station may adjust a corresponding ATIM window for that station based on the broadcasted ATIM window length. Each station may then account for a beaconed ATIM window length in a subsequent beacon interval.

The above-described method dynamically scales ATIM windows to provide the appropriate time for the transmission of ATIM frames and the reception of ATIM frame acknowledgement signals.

Referring now also to FIG. 9, a logic flow diagram illustrating a method of operating a station in an ad-hoc wireless network is shown. The method of FIG. 9 may be incorporated into the method of FIG. 8. For example, the following steps 352-360 may be performed during and/or after steps 306, 308, 324 and 326. The method may begin at step 350.

In step 351, a local station calculates an ATIM window length. The ATIM window length may be calculated using equation 1.

In step 352, the local station detects a change in the number of local active conversations and updates a local active conversation status indicator. The local station detects when the local station is involved in a larger or smaller number of local active conversations. This detection may occur through internal awareness that a current conversation is completed or is to be completed. This detection may occur due to loss in a communication connection with another station or can be based on a signal received from another station. A remote station may indicate the completion of an active conversation via, for example, a data received acknowledgement.

In step 354, the station may decrease the size of its beacon contention window based on the updated number of local active conversations. A beacon contention window may refer to the DIPS period plus the corresponding backoff period for that station. When generating the backoff period, an upper limit M for a selected random number may be adjusted, as represented by box 356. This adjustment can increase the probability of the station being the next station to obtain rights to broadcast/transmit over a channel in the wireless network. For example, a normal backoff selection range may be 0-M, where 0 is the lower limit and M is the upper limit. A random number is selected between 0-M during normal operation. When there is a change in the number of local active conversations, the value of M may be decreased to allow a local station to broadcast the change in the number of active conversations.

The adjustment in the upper limit M alters a probability of beaconing and/or conveying the change in the number of local active conversations to other stations for a current beacon interval. The adjustment may be maintained for a predetermined number of TBTTs or beacon intervals. After the local station conveys to other stations the change in the number of active conversations, the local station may return to a normal beacon contention window.

In step 358, the local station broadcasts the updated number of local active conversations. The updated number of local active conversations may be broadcasted as part of a beacon timing signal, such as part of steps 310 or 330. The updated number of local active conversations may be transmitted: as unsolicited probe signals; as probe response signals to received update requests; to one or more designated stations, etc. In step 360, control returns the upper limit M to a normal upper backoff limit.

To minimize power consumption, the embodiments disclosed herein allow the stations in a Basic Service Set (BSS) to update each other with respect to various parameters, such as those described with respect to FIGS. 3-6. This allows for the dynamic adjustment of the ATIM windows for each station and the quick convergence to a common ATIM window for each station. The amount of time that each station spends in the low-power mode is significantly increased, which reduces the average power consumption of the stations.

Referring now to FIG. 10, a flow diagram illustrating an example method of shutting down a station that is operating in an ad-hoc mode is shown. Although the steps of FIG. 10 are described primarily with respect to the embodiment of FIG. 3, the steps may be applied to other embodiments of the present disclosure. When a station does not transmit or receive an ATIM frame during an ATIM window, the station may shutdown after the ATIM window period.

The method may begin at step 400. In step 402, the ad-hoc control module may calibrate the low-power oscillator 84 using signals generated by the XOSC 54. In step 404, the RF transceiver and the BBP are transitioned to the low-power state or mode. In step 406, the internal clocks are disabled and the PLLs, the XOSC and the voltage regulators are shut down. Wireless baseband circuitry may be shutdown.

The above-described steps in FIGS. 8-10 are meant to be illustrative examples; the steps may be performed sequentially, synchronously, simultaneously, continuously, during overlapping time periods or in a different order depending upon the application.

As can be appreciated, while the present invention has been described in conjunction with ad-hoc networks, skilled artisans will appreciate that the present invention also applies to wireless infrastructure networks as well. In addition, while the wireless network devices are implemented by an SOC, any other suitable approach can be used including but not limited to Application Specific Integrated Circuits (ASICs), controllers, processors and memory running firmware and/or software, combinatorial logic, discrete circuits and/or combinations thereof.

The embodiments of the present disclosure may be implemented in conformance with IEEE standards 802.11, 802.11a, 802.11b, 802.11g, 802.11h, 802.11n, 802.16, and 802.20 and/or Wi-Fi standards, which are all incorporated by reference herein in their entirety. The embodiments of the present disclosure may also incorporate Bluetooth protocols for communication between wireless stations.

The embodiments of the present disclosure conserve power. By iteratively adjusting ATIM window length to an appropriate level for a current beacon interval, the embodiments reduce the amount of time that stations are in high-power and/or active power states. All ATIM frames may be transmitted during a current ATIM window rather than holding one or more ATIM frames for subsequent beacon intervals. In providing an appropriate sized ATIM window, a data transmission window is adjusted accordingly. When the ATIM window is decreased in size, the data transmission window is increased, thus allowing for an increase in data throughput and bandwidth. This prevents backlogs of ATIM frames and data.

Referring now to FIGS. 11A-11G, various exemplary implementations incorporating the teachings of the present disclosure are shown.

Figure 11A:
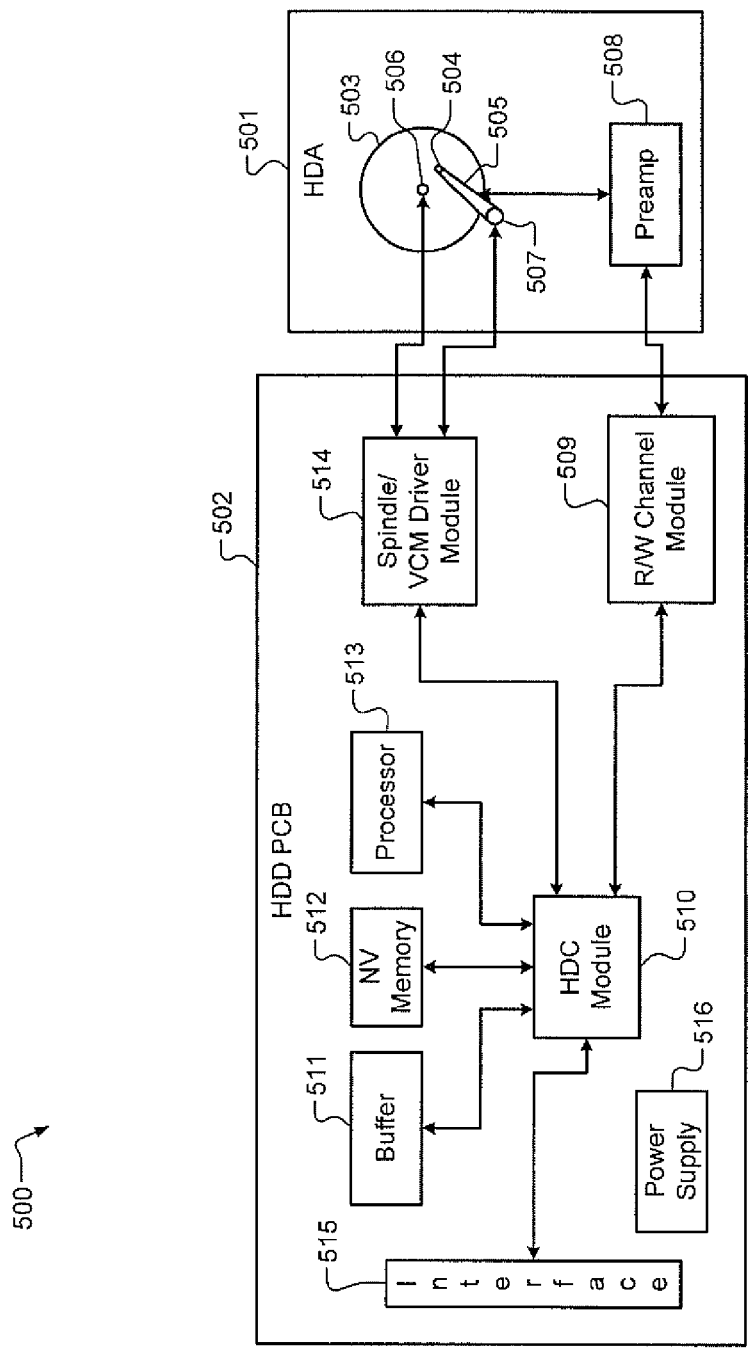
FIG. 11A is a functional block diagram of a hard disk drive.

Referring now to FIG. 11A, the teachings of the disclosure can be implemented in a hard disk controller (HDC) module 510 using a nonvolatile memory 512 or a hard disk assembly (HDA) 501 of a hard disk drive (HDD) 500. The nonvolatile memory 512 and/or the HDA 501 may store the above-described databases. The HDD 500 includes a hard disk assembly (HDA) 501 and an HDD printed circuit board (PCB) 502. The HDA 501 may include a magnetic medium 503, such as one or more platters that store data, and a read/write device 504. The read/write device 504 may be arranged on an actuator arm 505 and may read and write data on the magnetic medium 503. Additionally, the HDA 501 includes a spindle motor 506 that rotates the magnetic medium 503 and a voice-coil motor (VCM) 507 that actuates the actuator arm 505. A preamplifier device 508 amplifies signals generated by the read/write device 504 during read operations and provides signals to the read/write device 504 during write operations.

The HDD PCB 502 includes a read/write channel module (hereinafter, "read channel") 509, the HDC module 510, a buffer 511, the nonvolatile memory 512, a processor 513, and a spindle/VCM driver module 514. The read channel 509 processes data received from and transmitted to the preamplifier device 508. The HDC module 510 controls components of the HDA 501 and communicates with an external device (not shown) via an I/O interface 515. The external device may include a computer, a multimedia device, a mobile computing device, etc. The I/O interface 515 may include wireline and/or wireless communication links.

The HDC module 510 may receive data from the HDA 501, the read channel 509, the buffer 511, nonvolatile memory 512, the processor 513, the spindle/VCM driver module 514, and/or the I/O interface 515. The processor 513 may process the data, including encoding, decoding, filtering, and/or formatting. The processed data may be output to the HDA 501, the read channel 509, the buffer 511, nonvolatile memory 512, the processor 513, the spindle/VCM driver module 514, and/or the I/O interface 515.

The HDC module 510 may use the buffer 511 and/or nonvolatile memory 512 to store data related to the control and operation of the HDD 500. The buffer 511 may include DRAM, SDRAM, etc. Nonvolatile memory 512 may include any suitable type of semiconductor or solid-state memory, such as flash memory (including NAND and NOR flash memory), phase change memory, magnetic RAM, and multi-state memory, in which each memory cell has more than two states. The spindle/VCM driver module 514 controls the spindle motor 506 and the VCM 507. The HDD PCB 502 includes a power supply 516 that provides power to the components of the HDD 500.

Figure 11B:
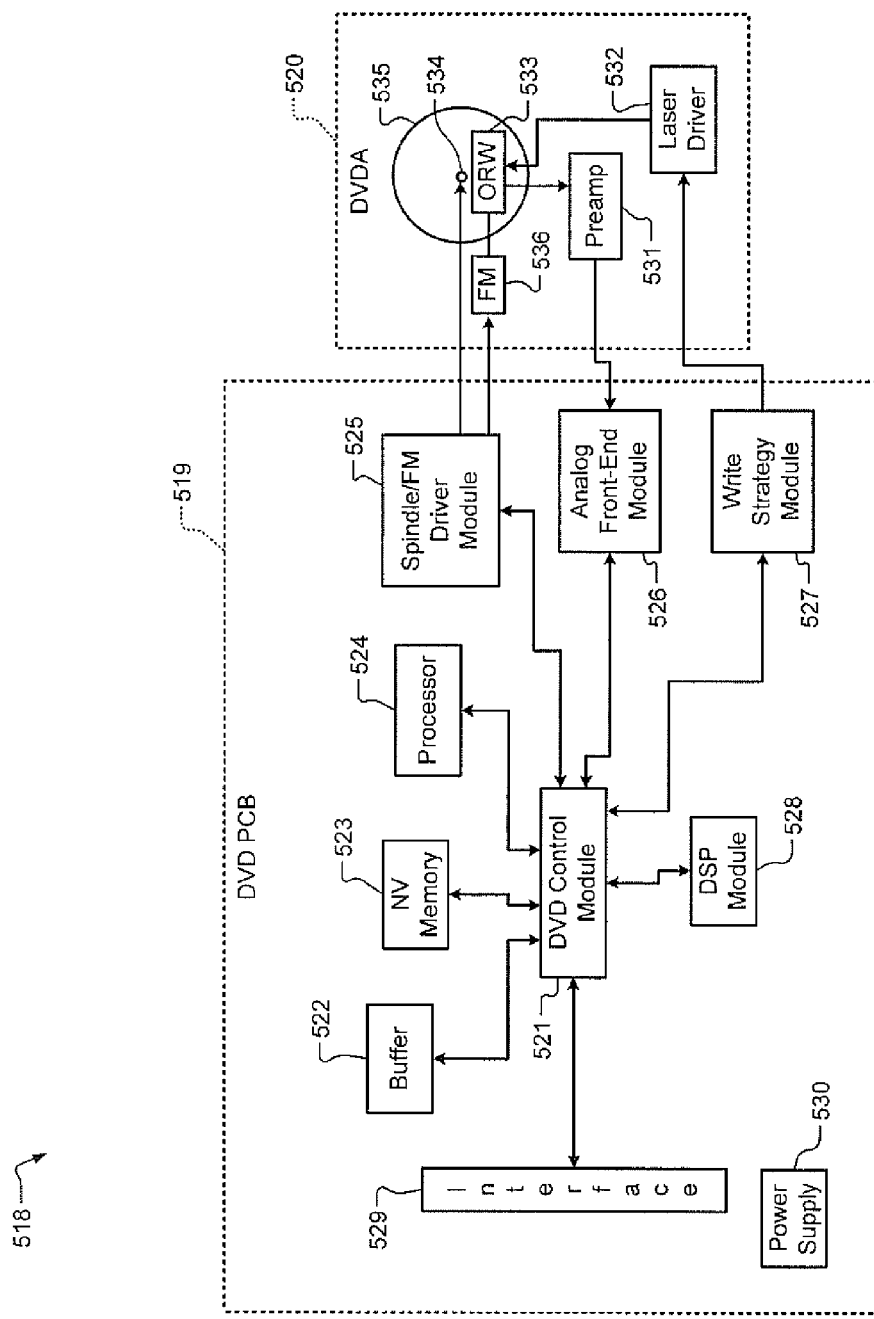
FIG. 11B is a functional block diagram of a DVD drive.

Referring now to FIG. 11B, the teachings of the disclosure can be implemented in a in a DVD control module 510 using a nonvolatile memory 523 or a DVD assembly (DVDA) 520 of a DVD 518 or of a CD drive (not shown). The nonvolatile memory 523 and/or the DVDA 520 may store the above-described databases. The DVD drive 518 includes a DVD PCB 519 and the DVDA 520. The DVD PCB 519 includes the DVD control module 521, a buffer 522, the nonvolatile memory 523, a processor 524, a spindle/FM (feed motor) driver module 525, an analog front-end module 526, a write strategy module 527, and a DSP module 528.

The DVD control module 521 controls components of the DVDA 520 and communicates with an external device (not shown) via an I/O interface 529. The external device may include a computer, a multimedia device, a mobile computing device, etc. The I/O interface 529 may include wireline and/or wireless communication links.

The DVD control module 521 may receive data from the buffer 522, nonvolatile memory 523, the processor 524, the spindle/FM driver module 525, the analog front-end module 526, the write strategy module 527, the DSP module 528, and/or the I/O interface 529. The processor 524 may process the data, including encoding, decoding, filtering, and/or formatting. The DSP module 528 performs signal processing, such as video and/or audio coding/decoding. The processed data may be output to the buffer 522, nonvolatile memory 523, the processor 524, the spindle/FM driver module 525, the analog front-end module 526, the write strategy module 527, the DSP module 528, and/or the I/O interface 529.

The DVD control module 521 may use the buffer 522 and/or nonvolatile memory 523 to store data related to the control and operation of the DVD drive 518. The buffer 522 may include DRAM, SDRAM, etc. Nonvolatile memory 523 may include any suitable type of semiconductor or solid-state memory, such as flash memory (including NAND and NOR flash memory), phase change memory, magnetic RAM, and multi-state memory, in which each memory cell has more than two states. The DVD PCB 519 includes a power supply 530 that provides power to the components of the DVD drive 518.

The DVDA 520 may include a preamplifier device 531, a laser driver 532, and an optical device 533, which may be an optical read/write (ORW) device or an optical read-only (OR) device. A spindle motor 534 rotates an optical storage medium 535, and a feed motor 536 actuates the optical device 533 relative to the optical storage medium 535.

When reading data from the optical storage medium 535, the laser driver provides a read power to the optical device 533. The optical device 533 detects data from the optical storage medium 535, and transmits the data to the preamplifier device 531. The analog front-end module 526 receives data from the preamplifier device 531 and performs such functions as filtering and A/D conversion. To write to the optical storage medium 535, the write strategy module 527 transmits power level and timing data to the laser driver 532. The laser driver 532 controls the optical device 533 to write data to the optical storage medium 535.

Figure 11D:
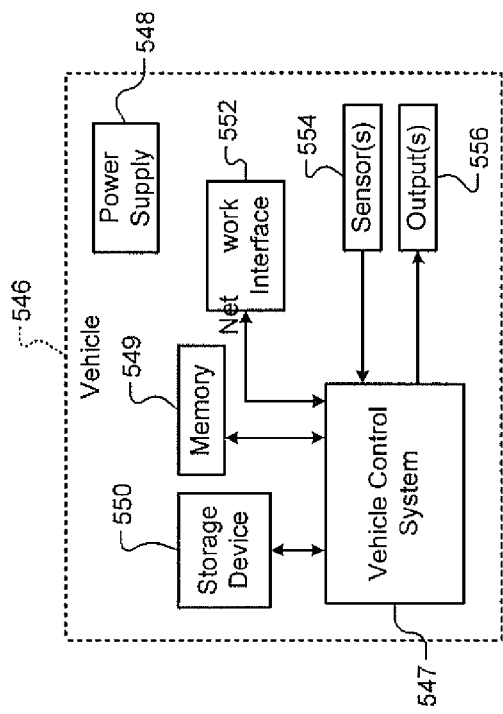
FIG. 11D is a functional block diagram of a vehicle control system.
Figure 11C:
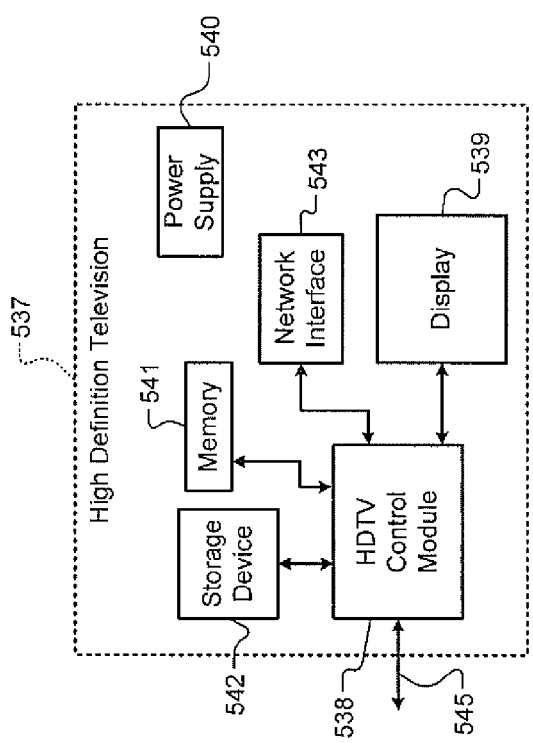
FIG. 11C is a functional block diagram of a high definition television.

Referring now to FIG. 11C, the teachings of the disclosure can be implemented in a high definition television (HDTV) control module 538 using memory 541 or a storage device 542 of a HDTV 537. The memory 541 and/or the storage device 542 may store the above-described databases. The HDTV 537 includes the HDTV control module 538, a display 539, a power supply 540, the memory 541, the storage device 542, a network interface 543, and an external interface 545. If the network interface 543 includes a wireless local area network interface, an antenna (not shown) may be included.

The HDTV 537 can receive input signals from the network interface 543 and/or the external interface 545, which can send and receive data via cable, broadband Internet, and/or satellite. The HDTV control module 538 may process the input signals, including encoding, decoding, filtering, and/or formatting, and generate output signals. The output signals may be communicated to one or more of the display 539, memory 541, the storage device 542, the network interface 543, and the external interface 545.

Memory 541 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 542 may include an optical storage drive, such as a DVD drive, and/or a hard disk drive (HDD). The HDTV control module 538 communicates externally via the network interface 543 and/or the external interface 545. The power supply 540 provides power to the components of the HDTV 537.

Referring now to FIG. 11D, the teachings of the disclosure may be implemented in a vehicle control system 547 using memory 549 or a storage device 550 of a vehicle 546. The memory 549 and/or the storage device 550 may store the above-described databases. The vehicle 546 may include the vehicle control system 547, a power supply 548, the memory 549, the storage device 550, and a network interface 552. If the network interface 552 includes a wireless local area network interface, an antenna (not shown) may be included. The vehicle control system 547 may be a powertrain control system, a body control system, an entertainment control system, an anti-lock braking system (ABS), a navigation system, a telematics system, a lane departure system, an adaptive cruise control system, etc.

The vehicle control system 547 may communicate with one or more sensors 554 and generate one or more output signals 556. The sensors 554 may include temperature sensors, acceleration sensors, pressure sensors, rotational sensors, airflow sensors, etc. The output signals 556 may control engine operating parameters, transmission operating parameters, suspension parameters, brake parameters, etc.

The power supply 548 provides power to the components of the vehicle 546. The vehicle control system 547 may store data in memory 549 and/or the storage device 550. Memory 549 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 550 may include an optical storage drive, such as a DVD drive, and/or a hard disk drive (HDD). The vehicle control system 547 may communicate externally using the network interface 552.

Figure 11F:
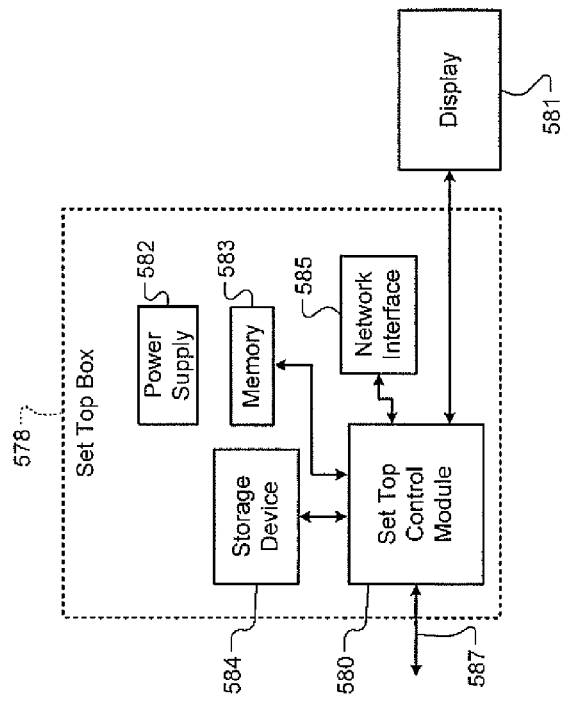
FIG. 11F is a functional block diagram of a set top box.
Figure 11E:
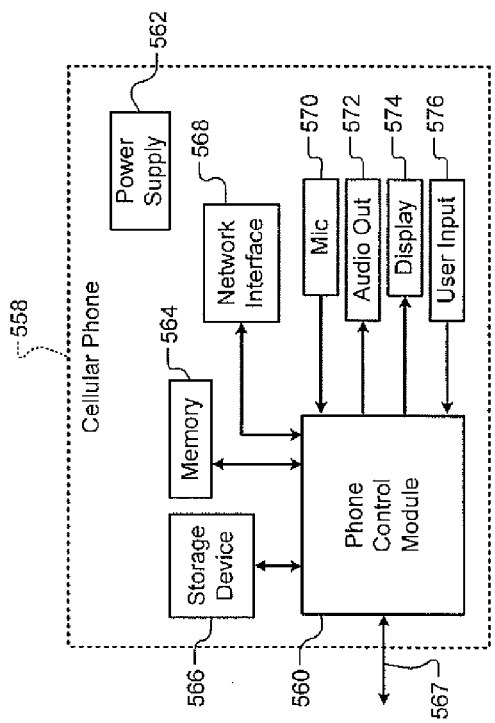
FIG. 11E is a functional block diagram of a cellular phone.

Referring now to FIG. 11E, the teachings of the disclosure can be implemented in a phone control module 560 using memory 564 or a storage device 566 of a cellular phone 558. The memory 564 and/or the storage device 564 may store the above-described databases. The cellular phone 558 includes the phone control module 560, a power supply 562, the memory 564, the storage device 566, and a cellular network interface 567. The cellular phone 558 may include a network interface 568, a microphone 570, an audio output 572 such as a speaker and/or output jack, a display 574, and a user input device 576 such as a keypad and/or pointing device. If the network interface 568 includes a wireless local area network interface, an antenna (not shown) may be included.

The phone control module 560 may receive input signals from the cellular network interface 567, the network interface 568, the microphone 570, and/or the user input device 576. The phone control module 560 may process signals, including encoding, decoding, filtering, and/or formatting, and generate output signals. The output signals may be communicated to one or more of memory 564, the storage device 566, the cellular network interface 567, the network interface 568, and the audio output 572.

Memory 564 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 566 may include an optical storage drive, such as a DVD drive, and/or a hard disk drive (HDD). The power supply 562 provides power to the components of the cellular phone 558.

Referring now to FIG. 11F, the teachings of the disclosure can be implemented in a set top control module 580 using memory 583 or a storage device 584 of a set top box 578. The memory 583 and/or the storage device 584 may store the above-described databases. The set top box 578 includes the set top control module 580, a display 581, a power supply 582, the memory 583, the storage device 584, and a network interface 585. If the network interface 585 includes a wireless local area network interface, an antenna (not shown) may be included.

The set top control module 580 may receive input signals from the network interface 585 and an external interface 587, which can send and receive data via cable, broadband Internet, and/or satellite. The set top control module 580 may process signals, including encoding, decoding, filtering, and/or formatting, and generate output signals. The output signals may include audio and/or video signals in standard and/or high definition formats. The output signals may be communicated to the network interface 585 and/or to the display 581. The display 581 may include a television, a projector, and/or a monitor.

The power supply 582 provides power to the components of the set top box 578. Memory 583 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 584 may include an optical storage drive, such as a DVD drive, and/or a hard disk drive (HDD).

Figure 11G:
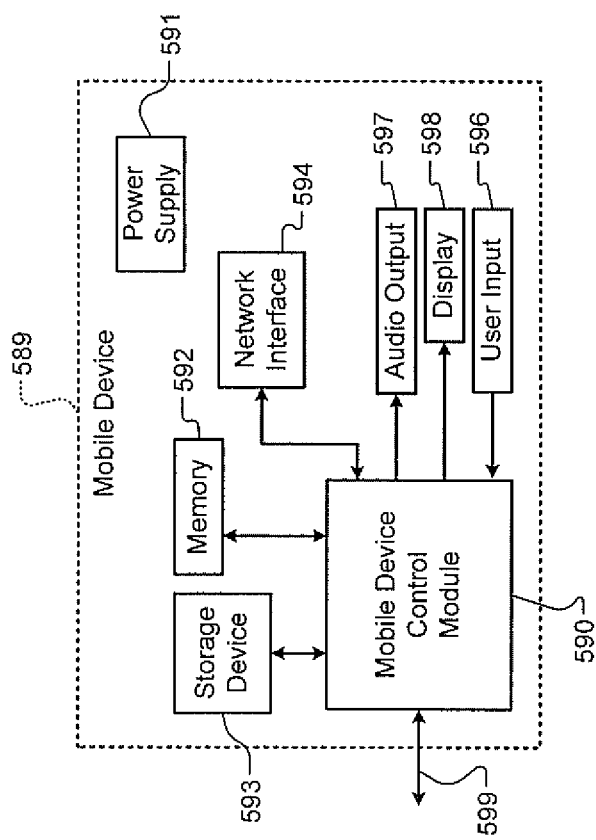
FIG. 11G is a functional block diagram of a mobile device.

Referring now to FIG. 11G, the teachings of the disclosure can be implemented in a mobile device control module 590 using memory 592 or a storage device 593 of a mobile device 589. The memory 592 and/or the storage device 593 may store the above-described databases. The mobile device 589 may include the mobile device control module 590, a power supply 591, the memory 592, the storage device 593, a network interface 594, and an external interface 599. If the network interface 594 includes a wireless local area network interface, an antenna (not shown) may be included.

The mobile device control module 590 may receive input signals from the network interface 594 and/or the external interface 599. The external interface 599 may include USB, infrared, and/or Ethernet. The input signals may include compressed audio and/or video, and may be compliant with the MP3 format. Additionally, the mobile device control module 590 may receive input from a user input 596 such as a keypad, touchpad, or individual buttons. The mobile device control module 590 may process input signals, including encoding, decoding, filtering, and/or formatting, and generate output signals.

The mobile device control module 590 may output audio signals to an audio output 597 and video signals to a display 598. The audio output 597 may include a speaker and/or an output jack. The display 598 may present a graphical user interface, which may include menus, icons, etc. The power supply 591 provides power to the components of the mobile device 589. Memory 592 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 593 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network device comprising:
    a transceiver configured to detect beacons or probe responses transmitted between stations in a network, wherein each of the stations is separate from other ones of the stations, and wherein a first one of the stations includes the network device; and
    a control module configured to (i) determine a number of active conversations in the network based on the beacons or probe responses, (ii) adjust a length of a window based on the number of active conversations, and (iii) transition between power modes based on the length of the window, wherein each of the active conversations refers to a respective communication session between two or more of the stations, and
    wherein, during the window, the control module is configured to transmit a frame via the transceiver, and wherein the frame indicates the network device has a packet to transmit to a second one of the stations.

2. The network device of claim 1, further comprising a memory,
    wherein the control module is configured to (i) store the number of active conversations in the memory, and (ii) update the number of active conversations in response to the beacons or probe responses.

3. The network device of claim 1, wherein:
    the control module is configured to transition between the power modes during a beacon interval;
    the beacon interval begins at a first beacon and ends at a second beacon; and
    the second beacon is transmitted consecutively after the first beacon.

4. The network device of claim 1, wherein the network is an ad-hoc network.

5. The network device of claim 1, further comprising a random number generator configured to generate a random number, wherein:
    the control module is configured to (i) determine a first period based on the random number, and (ii) add the first period to a second period; and
    the transceiver is configured to transmit the packet to the second one of the stations during the second period.

6. The network device of claim 5, wherein the control module is configured to determine the length of the window based on the first period and the second period.

7. The network device of claim 1, wherein:
    the transceiver is configured to receive a random number from a third one of the stations;
    the control module is configured to (i) determine a first period based on the random number, and (ii) add the first period to a second period; and
    the transceiver is configured to transmit the packet to the second one of the stations during the second period.

8. The network device of claim 1, wherein the control module is configured to deactivate the transceiver when transitioning between the power modes.

9. The network device of claim 1, wherein the control module is configured to:
    when transitioning between the power modes, transition from a first power mode to a second power mode, wherein the network device consumes less power in the second power mode than in the first power mode; and
    instruct a baseband processor to operate in the second power mode based on the length of the window.

10. The network device of claim 1, wherein:
    the control module is configured to determine the length of the window based on a duration of the frame, an interframe space period, and an acknowledgement period;
    during the interframe space period, the control module is configured to transmit the packet to the second one of the stations; and
    during the acknowledgement period, the transceiver is configured to receive an acknowledgement from the second one of the stations indicating the frame was received by the second one of the stations.

11. The network device of claim 1, wherein the control module is configured to transmit via the transceiver the length of the window to a third one of the stations.

12. The network device of claim 1, wherein:
    the control module is configured to (i) determine a first period based on the number of active conversations, and (ii) add the first period to a second period; and
    the transceiver is configured to transmit the packet to the second one of the stations during the second period.

13. The network device of claim 1, wherein the beacons or probe responses have a same service set identifier.

14. The network device of claim 1, wherein:
    the control module is configured to maintain a first list of the active conversations in the network;
    a third one of the stations maintains a second list of the active conversations;
    the transceiver is configured to receive the second list of the active conversations from the third one of the stations; and
    the control module is configured to adjust the length of the window based on the first list of the conversations and the second list of the conversations.

15. The network device of claim 1, wherein:
    the active conversations comprise a first active conversation and a second active conversation; and
    at least one of the stations involved in the first active conversation is not involved in the second active conversation.

16. A network device comprising:
    a transceiver configured to detect beacons or probe responses transmitted between stations in a network, wherein each of the stations is separate from other ones of the stations, and wherein a first one of the stations includes the network device; and
    a control module configured to (i) determine a number of active conversations in the network based on the beacons or probe responses, (ii) adjust a length of a window based on the number of active conversations, and (iii) transition between power modes based on the length of the window,
    wherein
        during the window, the control module is configured to transmit a frame via the transceiver, and wherein the frame indicates the network device has a packet to transmit to a second one of the stations,
        the window is one of a plurality of ad-hoc traffic indication map windows,
        a third one of the stations iteratively transmits one of the beacons during each of consecutive beacon intervals, wherein each of the consecutive beacon intervals includes a respective one of the plurality of ad-hoc traffic indication map windows, the frame is one of a plurality of ad-hoc traffic indication map frames, and the control module is configured to transmit via the transceiver the plurality of ad-hoc traffic indication map frames during respective ones of the plurality of ad-hoc traffic indication map windows.

17. A network device comprising:

a transceiver configured to detect beacons or probe responses transmitted between stations in a network, wherein each of the stations is separate from other ones of the stations, and wherein a first one of the stations includes the network device; and a control module configured to (i) determine a number of active conversations in the network based on the beacons or probe responses, (ii) adjust a length of a window based on the number of active conversations, and (iii) transition between power modes based on the length of the window, wherein during the window, the control module is configured to transmit a frame via the transceiver, and wherein the frame indicates the network device has a packet to transmit to a second one of the stations, the transceiver is configured to (i) transmit a probe request to a third one of the stations, and (ii) receive an indication signal from the third one of the stations based on the probe request, the indication signal indicates a number of the stations operating in an active mode, and the control module is configured to adjust the length of the window based on the number of the stations operating in the active mode.

18. A network device comprising:

a transceiver configured to detect beacons or probe responses transmitted between stations in a network, wherein each of the stations is separate from other ones of the stations, and wherein a first one of the stations includes the network device;

a control module configured to (i) determine a number of active conversations in the network based on the beacons or probe responses, (ii) adjust a length of a window based on the number of active conversations, and (iii) transition between power modes based on the length of the window; and a counter, wherein during the window, the control module is configured to transmit a frame via the transceiver, and wherein the frame indicates the network device has a packet to transmit to a second one of the stations, when transitioning between the power modes, the control module is configured to transition from a first power mode to a second power mode, the network device consumes less power in the second power mode than in the first power mode, and the control module is configured to (i) trigger the counter to start a predetermined period when transitioning to the second power mode, and (ii) return the network device to the first power mode when the counter reaches an end of the predetermined period.

19. A method of operating a network device, the method comprising:

detecting beacons or probe responses transmitted between stations in a network, wherein each of the stations is separate from other ones of the stations, and wherein a first one of the stations includes the network device;

determining a number of active conversations in the network based on the beacons or probe responses, wherein each of the active conversations refers to a respective communication session between two or more of the stations, and;

adjusting a length of a window based on the number of active conversations;

transitioning between power modes based on the length of the window; and during the window, transmitting a frame, wherein the frame indicates the network device has a packet to transmit to a second one of the stations.

20. The method of claim 19, wherein:

the window is one of a plurality of ad-hoc traffic indication map windows;

a third one of the stations iteratively transmits one of the beacons during each of consecutive beacon intervals;

each of the consecutive beacon intervals includes a respective one of the plurality of ad-hoc traffic indication map windows;

the frame is one of a plurality of ad-hoc traffic indication map frames; and the method further comprises transmitting the plurality of ad-hoc traffic indication map frames during respective ones of the plurality of ad-hoc traffic indication map windows.

21. The method of claim 19, further comprising:

determining a first period based on a random number or the number of active conversations; and adding the first period to a second period, wherein the packet is transmitted to the second one of the stations during the second period.

* * * * *